US011132735B2

(12) United States Patent
Sivan et al.

(10) Patent No.: US 11,132,735 B2
(45) Date of Patent: Sep. 28, 2021

(54) DYNAMIC PRODUCT SUGGESTIONS AND IN-STORE FULFILLMENT

(71) Applicant: Target Brands, Inc., Minneapolis, MN (US)

(72) Inventors: Jayachandran Sivan, Minneapolis, MN (US); Mindy Meyer, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 34 days.

(21) Appl. No.: 16/693,106

(22) Filed: Nov. 22, 2019

(65) Prior Publication Data

US 2021/0082024 A1 Mar. 18, 2021

Related U.S. Application Data

(60) Provisional application No. 62/901,628, filed on Sep. 17, 2019.

(51) Int. Cl.
*G06Q 30/06* (2012.01)
*G06Q 20/20* (2012.01)
(Continued)

(52) U.S. Cl.
CPC ........... *G06Q 30/0631* (2013.01); *G06F 3/14* (2013.01); *G06K 7/1413* (2013.01);
(Continued)

(58) Field of Classification Search
CPC ........... G06Q 30/0631; G06Q 30/0205; G06Q 30/0643; G06Q 30/0201; G06Q 20/208; G06K 7/1417; G06K 7/1413; G06F 3/14
(Continued)

(56) References Cited

U.S. PATENT DOCUMENTS 8,145,525 B2 3/2012 Zeevi et al.
10,102,513 B2 10/2018 Dar
(Continued)

FOREIGN PATENT DOCUMENTS

WO WO-2015185438 A1 * 12/2015 ........... G06Q 10/087

OTHER PUBLICATIONS

Jon Porter, This smart shopping cart is a self-service checkout on wheels, 2019 (Year: 2019).*
Kristina Lopienski, Ecommerce Fulfillment: The Unappreciated Yet Vital Strategy Brands Use to Win Loyal Customers, 2018 (Year: 2018).*

*Primary Examiner* — Tarek Elchanti
(74) *Attorney, Agent, or Firm* — Fish & Richardson P.C.

(57) ABSTRACT

In one implementation, a system for providing product suggestions to provide to a customer during a checkout process at a retail store includes a checkout configuration that includes a point of sale terminal, a scanner to scan products, a scanning preparation area where products to be scanned are positioned, and a customer-facing device. The system can further include one or more product sensors to capture and transmit product signals. The system can also include a product identification system that is programmed to identify the products contained in the scanning preparation area. The system can further include a product recommendation engine that is configured to identify contents of a customer cart from the products contained in the scanning preparation area; determine product recommendations based, at least in part, on the contents of the customer cart; and transmit the product recommendations to the customer-facing device for display to the user.

20 Claims, 12 Drawing Sheets

(51) Int. Cl.
  *G06F 3/14* (2006.01)
  *G06Q 30/02* (2012.01)
  *G06K 7/14* (2006.01)

(52) U.S. Cl.
  CPC ......... *G06K 7/1417* (2013.01); *G06Q 20/208* (2013.01); *G06Q 30/0201* (2013.01); *G06Q 30/0205* (2013.01); *G06Q 30/0643* (2013.01)

(58) Field of Classification Search
  USPC ............................. 705/14.42, 26.8; 108/42
  See application file for complete search history.

(56) References Cited

U.S. PATENT DOCUMENTS

| | | | |
|---|---|---|---|
| 2003/0205177 A1* | 11/2003 | Kerber | A47F 9/04 |
| | | | 108/42 |
| 2005/0187819 A1* | 8/2005 | Johnson | G06Q 30/0268 |
| | | | 705/14.42 |
| 2011/0153393 A1 | 6/2011 | Raff et al. | |
| 2011/0225063 A1* | 9/2011 | Grunski | G06Q 20/10 |
| | | | 705/26.8 |
| 2014/0019256 A1 | 1/2014 | Argue et al. | |
| 2014/0324611 A1 | 10/2014 | Burkhart et al. | |
| 2017/0124587 A1 | 5/2017 | White | |
| 2018/0101875 A1* | 4/2018 | Kim | G06Q 30/0282 |

\* cited by examiner

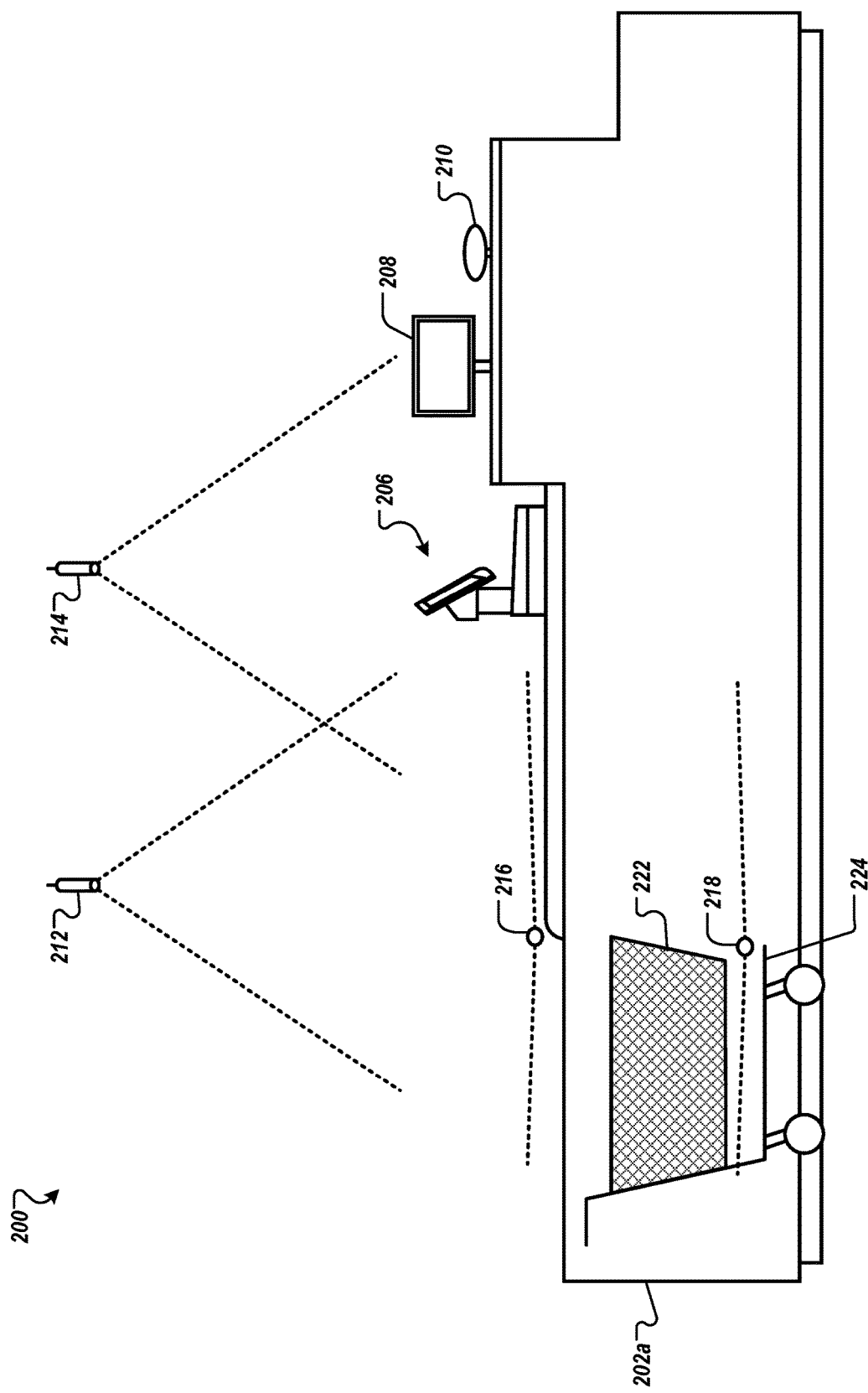

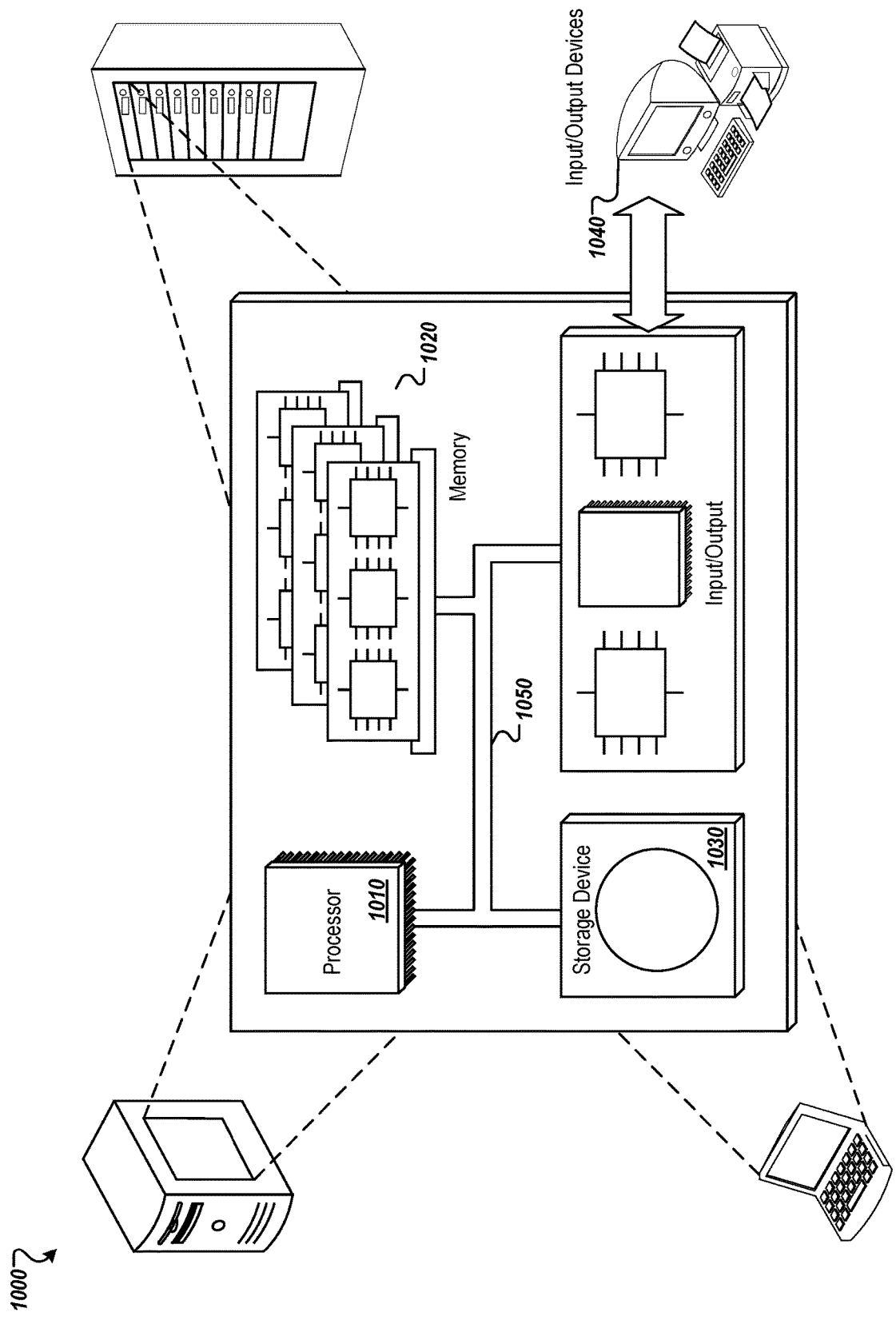

DYNAMIC PRODUCT SUGGESTIONS AND IN-STORE FULFILLMENT

CROSS-REFERENCE TO RELATED APPLICATIONS

This application claims the benefit of U.S. Provisional Application Ser. No. 62/901,628, filed Sep. 17, 2019. The disclosure of the prior application is considered part of (and is incorporated by referenced in) the disclosure of this application.

TECHNICAL FIELD

This document generally relates to systems and methods for providing dynamic product suggestions to a customer in a checkout aisle, in addition to providing in-store item fulfillment methods.

BACKGROUND

Checkout aisles can include a point-of-sale terminal, a product scanner to identify products (e.g., barcode scanner, QR code scanner), payment terminal for accepting payment (e.g., credit card reader), and, in some instances, a conveyor system to hold and transport products as part of the checkout process (e.g., conveyor belt holding and conveying products that are yet to be scanned during a checkout process). The point-of-sale terminal can compile transaction information and communicate with the payment terminal to complete a transaction. Checkout aisles can include self-check-out, employee run aisles, express lanes, etc. The point-of-sale terminal can be linked to other point-of-sale terminals throughout the store.

Virtual shopping carts are digital data elements used in electronic shopping environments to temporarily store a collection of user-selected items from the electronic shopping environment for purchase. Virtual shopping carts are analogous to physical shopping carts in physical shopping environments (e.g., retail stores, grocery stores, home improvement stores, etc.), but they are used in digital/electronic shopping environments, such as online shopping websites and mobile apps. Like using a physical shopping cart, which include a physical receptacle to temporarily store and collect items selected by the user as they shop, virtual shopping carts collect digital shopping items that have been selected by the user during the shopping experience. Items within a virtual shopping cart can be viewed, added to, modified, and deleted, and the contents of the virtual shopping can be selected for purchase together. Digital shopping items added to a virtual shopping cart can represent physical shopping items, which can be shipped or otherwise delivered to the user.

SUMMARY

This document generally describes relates to systems, devices, and methods for providing dynamic product suggestions to a customer in a checkout aisle, in addition to providing multiple different fulfillment options for dynamically suggested products, including in-store item fulfillment options. During a checkout process in a checkout aisle in a retail store, products can be dynamically suggested to a customer on a customer-facing device based on a variety of factors, such as products that have been scanned and/or are detected/identified as being queued-up for scanning during the checkout process, product purchasing behaviors relevant to the shopping experience (e.g., customer-specific shopping behaviors, store-specific shopping behaviors, time/day of week/seasonal shopping behaviors, and/or combinations thereof), and/or other factors. This technology can assist customers in a variety of ways during their checkout process, for example, by helping customers avoid forgetting to purchase items, by suggesting relevant products (e.g., avoiding suggesting products customer has placed on conveyor belt but have not yet been scanned), and by providing a variety of convenient fulfillment options (e.g., in-store fulfillment, shipping options).

For instance, during an example checkout process a customer selects a variety of products, including marshmallows and graham crackers, and places them on a conveyor belt at a checkout aisle for scanning and purchase. The disclosed technology can identify the marshmallows and graham crackers based on product scanning by the point of sale terminal and/or through product identifying devices that are located in or around the checkout lane. The marshmallow and graham cracker identification can be processed through product purchasing models (e.g., user-specific product purchasing models, store-specific product purchasing models, time/date/season product purchasing models, combinations thereof) to determine whether and to identify which additional, related products should be suggested to the customer on a customer-facing device at the checkout lane. In this example, the product purchasing models identify that chocolate bars should be suggested because marshmallows, graham crackers, and chocolate bars are frequently purchased together (e.g., purchased together to make s'mores). The system can analyze the products that have been scanned and/or identified on the conveyor belt for scanning to determine whether chocolate bars are already to be included in the customer's purchase. If the chocolate bars are not included in the customer's current purchase, then chocolate bars can be suggested to the customer on a customer-facing device at the checkout aisle. The user can be provided with options to add the chocolate bars to the purchase, and can be presented with multiple different fulfillment options, including in-store fulfillment, delivery/shipping options, and/or other fulfillment options.

Customer-facing device can be used to present additional information to customers in a checkout aisle during the checkout process. The additional information can include, for example, suggestions on additional products to add to the customer's purchase during the checkout process, along with selectable options for the customer to add the suggested products to the customer's cart, to designate quantities for the products, to select fulfillment options for the products (e.g., in-store fulfillment, pick-up, delivery), and/or other options. Therefore, the customer-facing device can allow a customer to modify a transaction during checkout by adding virtual products (not physically present during the checkout process) to a shopping cart of physical products. The customer-facing device can be connected to a product suggestion system that determines products to suggest on the customer-facing device based on any of a variety of available information during the checkout process, such as information on scanned products, information on products that have been yet to be scanned (e.g., products on conveyor belt, products in physical shopping cart), information on the individual customer's historical shopping behavior (e.g., customer loyalty account information), information on the recent purchasing behavior of other customers in the individual store, and/or combinations thereof.

For instance, in an example scenario in which a customer has multiple boxes of cereal in his/her physical shopping cart but does not have any milk (example item that may, in some instances, typically be purchased with cereal), the system may detect that cereal is present in the cart but not milk. For example, the system can analyze product scans during the checkout process and can also use various product sensing devices (e.g., cameras, RFID sensors) that are trained on or around the product conveyor system and the shopping cart area to identify products that are going to be purchased but have yet to be scanned. Based on this analysis, the system can determine that several boxes of cereal are being purchased, but that milk is not present in the order. Based on this information, the system can determine and provide a suggestion to purchase milk to the customer on the customer-facing device. The customer can then select the quantity of milk to purchase and from available fulfillment options for the product (e.g., in-store, pick-up, delivery), and the selected options can be added to the products being purchased. The customer-facing device can help customers by providing convenient and unobtrusive suggestions for products that may have been forgotten/missed during a shopping experience, and can provide customers with convenient options to still purchase those items without having to run around the store to retrieve them.

The customer-facing device can aim to present helpful and relevant suggestions to the customer. For example, through the use of product sensing devices to identify products that are part of the customer's order but have not yet been scanned (e.g., items on the conveyor belt or in the customer's shopping cart), product suggestions on the customer-facing device can avoid providing duplicative product suggestions for products that are already included in the shopping cart (but which have not yet been scanned). By using product sensing devices, the full scope of the contents in a customer's shopping can be determined earlier and can permit for non-duplicative product suggestions to be determined earlier during the checkout process (e.g., determined before all of the products have been scanned). Additionally, by using product sensing devices, more comprehensive and accurate product suggestions can be presented earlier in the checkout process, which can be helpful to the customer by providing the customer with more time to make decisions and permitting for more efficient fulfillment. For example, if the customer makes a decision to add a product to the transaction earlier in the checkout process, then fulfillment can start earlier and run concurrent while the checkout process is being completed, and can permit for a customer to have a shorter wait (if any wait at all) for in-store fulfillment of the product.

Additionally and/or alternatively, the customer-facing device can be used by customers to search for products that can then be added to the transaction during the checkout process. Search parameters can be received by the customer-facing device and provided to a backend search system, which can provide search results to the customer-facing device for display to a customer. Products can be added to the transaction from the customer-facing device by the customer. For example, the customer may add products that were out of stock, could not be found, were forgotten, or the customer wanted fulfilled by different means.

The customer-facing device may indicate if the product is available in the store, or if the product is out of stock but available at nearby stores, or available online. The customer-facing device can provide various fulfillment options for the customer. For example, the fulfillment options can include in-store fulfillment, in-store pick up at a different store, delivery, or other means of fulfillment. The in-store fulfillment can allow a customer to leave the store with the physical product that was added to the transaction using the customer-facing device. The in-store pick up can allow a customer to pick up the physical product at a different store, such as when the product is out of stock at the present store. The delivery fulfillment can allow a product to be delivered to an address indicated by the customer on the customer-facing device.

Regardless of the method of fulfillment, the product can be added to the current transaction. Accordingly, the physical products being scanned in the checkout aisle, and the products added at the customer-facing device can be purchased in a single transaction, using a single payment method.

In one implementation, a system for providing product suggestions to provide to a customer during a checkout process at a retail store includes a checkout configuration that includes a point of sale terminal, a scanner to scan products, a scanning preparation area where products to be scanned are positioned, and a customer-facing device that includes a display to present product recommendations to a user. The system can further include one or more product sensors oriented toward the scanning preparation area so as to capture and transmit product signals that at least partially identify the products to be scanned that are contained in the scanning preparation area. The system can also include a product identification system that is programmed to identify the products contained in the scanning preparation area from the product signals received from the product sensors. The system can further include a product recommendation engine that is configured to identify contents of a customer cart from (i) the products contained in the scanning preparation area as identified by the product identification system and (ii) scanned products that have already been identified by the scanner; determine product recommendations based, at least in part, on the contents of the customer cart; and transmit the product recommendations to the customer-facing device for display to the user.

The system can optionally include one or more of the following features. The scanning preparation area can include a conveyor belt that supports and conveys the products to be scanned toward the scanner. The scanning preparation area can include an area that is part of or adjacent to the checkout configuration and that is configured for positioning or placing a shopping cart or shopping basket containing the products to be scanned. The scanning preparation area can include (i) a conveyor belt that supports and conveys the products to be scanned toward the scanner and (ii) an area that is part of or adjacent to the checkout configuration and that is configured for positioning or placing a shopping cart or shopping basket containing the products to be scanned. The product sensors can include one or more cameras. The one or more cameras can be positioned above the scanning preparation area. The one or more cameras can be positioned laterally adjacent the scanning preparation area. The one or more cameras can include a plurality of cameras, at least a first portion of which are positioned above the scanning preparation area and at least a second portion of which are positioned laterally adjacent the scanning preparation area.

The product sensors can include one or more RFID scanners. The product sensors can further include one or more cameras. The product recommendations can be determined to be different from the contents of the customer cart. The product recommendations can be determined additionally based on one or more product purchasing models that are applied to the contents of the customer cart. The one or more product purchasing models can include a user purchasing model that is specific to the user and that models purchasing behavior of the user based on historical purchases made by the user. The one or more product purchasing models can include a store purchasing model that is specific to a retail store in which the checkout configuration is located and that models purchasing behavior for customers of the store based on historical purchases made at the store. The one or more product purchasing models can include a region purchasing model that is specific to a geographic region in which a retail store housing the checkout configuration is located and that models purchasing behavior for customers of the geographic region based on historical purchases made at stores within the geographic region. The one or more product purchasing models can include a temporal purchasing model that is specific to a current timeframe in which the user is using the checkout configuration and that models purchasing behavior for purchases made within the current timeframe based on historical purchases made within analogous timeframes. The current timeframe can include a time of day. The current timeframe can include a day of the week. The current timeframe can include a week of the year. The current timeframe can include a current season. The one or more product purchasing models can include a current condition purchasing model that is specific to current conditions related to a retail store in which the checkout configuration is located and that models purchasing behavior for customers of the store under the current conditions based on historical purchases made at the store in analogous conditions. The current conditions can include a current weather at the retail store. The current conditions can include current sales and promotions that are available at the retail store.

The product recommendations can be determined additionally based on current levels of available stock for candidate products across one or more fulfillment channels, wherein the candidate products with current levels of available stock below a threshold level are excluded from being provided as the product recommendations. The one or more fulfillment channels can include an in-store fulfillment channel and the current levels of available stock comprise current in-store inventories for the candidate products. The current in-store inventories can include backroom inventories for the candidate products. The current in-store inventories can include showroom inventories for the candidate products. The product recommendation engine can further be configured to: receive selection of one or more recommended products via the customer-facing device for addition to and purchase with the contents of the customer cart, transmit the selection of the one or more recommended product to the point of sale terminal for inclusion in the user transaction, and transmit fulfillment instructions for the one or more recommended products to one or more fulfillment channels. The one or more fulfillment channels can include an in-store fulfillment channel. Transmitting fulfillment instructions can include identifying a retail store worker located closest to a fulfillment source for the one or more recommended products and transmitting fulfillment instructions to the retail store worker.

Particular embodiments of the subject matter described in this document can be implemented to realize one or more of the following advantages. For example, product-sensing devices can collect product information for a transaction before items are scanned, such as shopping carts that include product-sensing devices capable of sensing products placed in the carts and thereby eliminating the need for subsequent scanning. The product information can be used to determine the products on the conveyer belt or in the physical cart before items are scanned. Such information can be used to provide recommendations, promotional information, or other product information to the customer on the customer-facing device. In some embodiments, the product-sensing devices can also help identify when a customer has left products on a lower portion of the cart.

In another example, the customer-facing device can permit a customer to sign up for a loyalty program, modify user information relating to a loyalty program, or provide loyalty program credentials (e.g., phone number, loyalty number, loyalty card number, account number, etc.) during a transaction. This can allow users to complete actions while products are being scanned, without assistance from an employee. Therefore, the customer-facing device can decrease the amount of time a customer spends checking out at a store. Allowing customers to input their own information into the customer-facing device can also increase the likelihood of a customer joining a loyalty program because they do not need to present their information aloud, which can make some people uncomfortable in a public environment. In addition, information can be more accurate when received directly from the customer on the customer-facing device because miscommunication between the customer and the employee regarding personal information can be avoided.

In another example, the customer-facing device can permit a customer to search for a product. The customer may want to search for a product that the customer may have forgotten an item and remembered upon entering the checkout aisle. The customer may want to search for a product the customer wanted to buy, but could not find the product. Alternatively, the customer may want to see if a product is available in a different color or style. As another example, the customer may have found a product in store that they cannot take home, such as large or heavy items that the customer would rather have shipped to their house. Such items can all be searched for using the customer-facing device. The customer-facing device can then provide search results for the search, and the customer can view the results. If the product is found, the product can be added to the current transaction. The customer-facing device can provide multiple fulfillment options based on the customer needs. The product can be picked up in the current store, in a nearby store, or delivered to the customer. This will save time and hassle for the customer, as they can purchase the products in a single transaction, and reduce the likelihood that they will forget the product upon returning home.

In another example, product suggestions can be generated in a manner that they are relevant and helpful to customer. For instance, product recommendations can be based on a purchasing profile specific to the customer (e.g., historical in-store and/or online purchasing patterns for the customer), specific to the products being purchased (e.g., groupings of related and/or complementary products), specific to the store and/or region where the purchase is being made (e.g., historical purchasing patterns for customers at store and/or region where store is locate), specific to the temporal purchasing patterns (e.g., historical purchasing patterns specific to time of day, day of the week, week of the year, season, and/or other temporal factors), specific to current local conditions at store (e.g., weather, current in-store promotions), and/or other factors. Such use of models can permit for more accurate and relevant product suggestions to be determined and provided to users.

In another example, product suggestions can be generated in a manner so that they are not for products that are already included in the customer's assembled group of products to be purchased (e.g., located in shopping cart, placed on conveyor belt)—meaning that the suggestion will be relevant and helpful to the user (and will not identify a product the user has already added to the purchase). By not only identifying products based on scans at the point of sale terminal, but also identifying products that have not yet been scanned (e.g., using product scanning devices able to identify products placed on the conveyor belt and/or located in the customer's shopping cart) the set of products that have already been gathered by the customer can be determined. Product suggestions that would include products within such a set can be eliminated and not provided to the customer since they would be less relevant to the customer than other suggestions for products not yet gathered by the customer for purchase.

In another example, product suggestions can additionally be pared down based on the availability of the suggested products via one or more preferred fulfillment channels. For instance, a preferred fulfillment channel may be in-store fulfillment since it can be the most efficient (e.g., minimize time to get product to customer, minimize distance/cost for transporting product to customer). Candidate products that are identified for suggestion to the customer (e.g., related products that are not contained in the customer's assembled group of products for purchase) can be cross-referenced against the available stock of those products for in-store fulfillment. Products that do not have sufficient stock for in-store fulfillment (e.g., less than a threshold amount of in-store stock, which may be more than there simply being stock in the store) can be eliminated from being suggested to the guest. The level of sufficient stock to provide in-store fulfillment can vary, but can take into account variables that can impact the accuracy of in-store stock levels, such as guests having picked up a product in the store but not yet having purchased it (so the product appears to be in-stock even though it is currently in another guest's shopping cart). The use of such allocations and thresholds can ensure in-store fulfillment as an option when offered for product suggestions, and can avoid situations in which a customer selects in-store fulfillment for a suggested product but then the product is unavailable when the in-store fulfillment is attempted.

In another example, the retailer can also choose to provide promotional offerings (e.g., cash based promotional offering, percentage based promotional offering, point based promotional offering) to the customer as a bonus, for example, for "any wait time" incurred.

The details of one or more embodiments are set forth in the accompanying drawings and the description below. Other features, objects, and advantages will be apparent from the description, drawings, and from the claims.

DESCRIPTION OF DRAWINGS

FIG. 2C is a side view of the checkout aisle with the example product sensors and the example customer device of FIGS. 2A and 2B.

FIG. 10 is a schematic diagram that shows an example of a computing system.

Like reference symbols in the various drawings indicate like elements.

DETAILED DESCRIPTION

Figure 1:
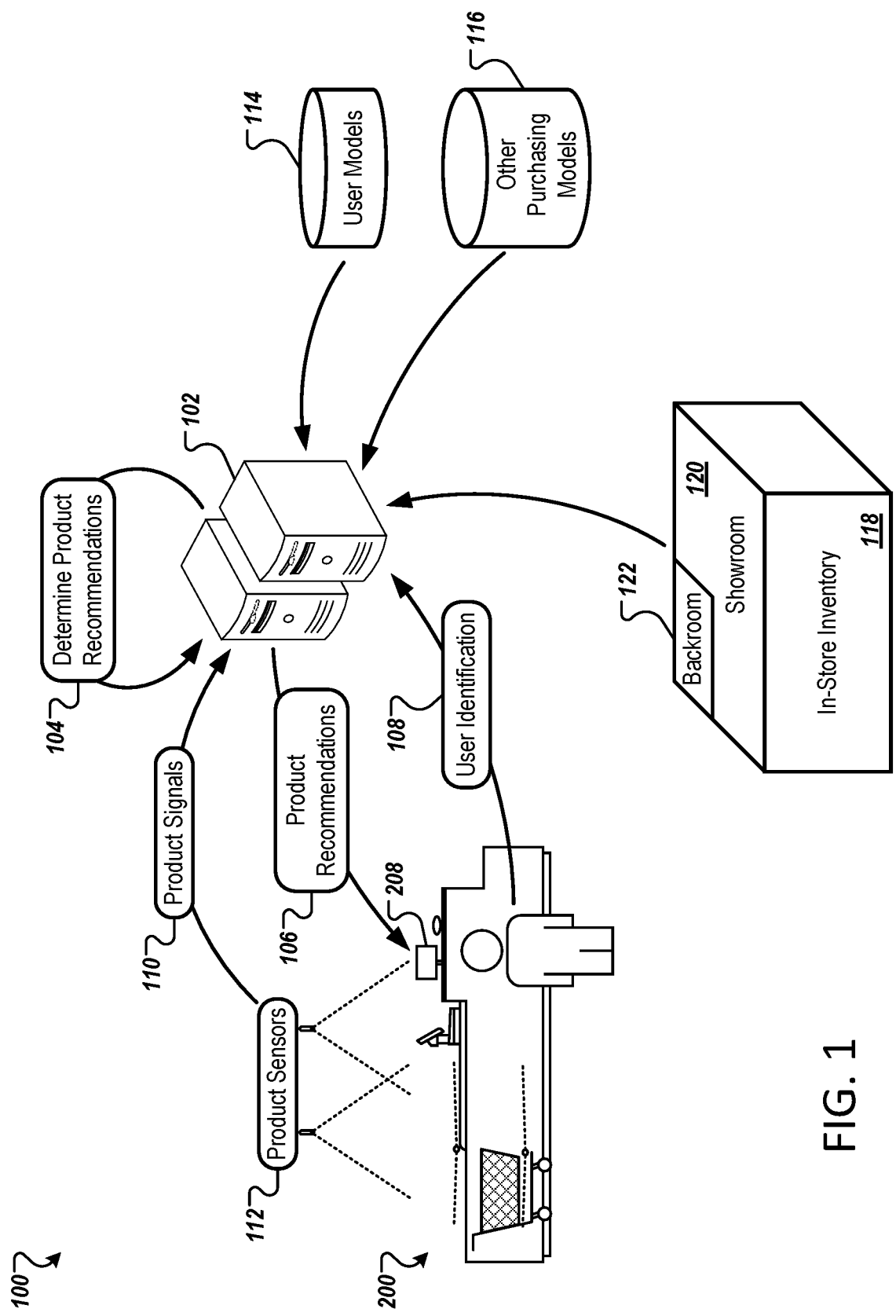
FIG. 1 is a conceptual diagram of an example system for providing product recommendation and in-store fulfillment.

FIG. 1 is a conceptual diagram of an example system 100 for providing product recommendation and in-store fulfillment. The example system 100 includes an example checkout aisle 200 with an example customer-facing device 208 and product sensors 112, all of which are described with greater detail below with regard to FIGS. 2A-C. The example system 100 also includes a computer system 102 (e.g., one or more computing devices, computer server system, computer system local at retail store where checkout aisle 200 is located, computer system remote from retail store where checkout aisle 200 is located) that is configured to determine product recommendations to provide to a customer on the customer-facing device 208.

Providing product recommendations can involve the product sensors 112 providing product signals 110 to the computer system 102. The product sensors 112 can include one or more devices that are configured to capture identifying information for the products that the user has gathered as part of his/her shopping experience and which have not yet been scanned by the point of sale terminal system. The product sensors 112 can include, for example, one or more cameras, one or more RFID scanners, and/or other devices that are capable of capturing product information from products not yet scanned (e.g., products in a shopping cart, products placed on a conveyor belt or other surface awaiting scanning). The product signals 110 can include information that provides at least some identifying information for the products not yet scanned, such as partial and/or whole images of the products from one or more vantage points, RFID scans of RFID tags attached/connected to the products, and/or other information. In some instances, the product sensors 112 can identify the products themselves and the product signals 110 can be positive product identifications (e.g., product identifications above at least a threshold level of confidence). In other instances, the product sensors 112 can provide images, RFID scans, and/or other captured product information to the computer system 102, which can perform the product identification using that information.

Using the product signals 110, the computer system 102 can determine product recommendations 104 to provide on the customer-facing device 208. The computer system 102 can make such determinations based additional information, such as a user identification 108 (if available) for the customer currently checking out at the checkout aisle 200, user models 114 modeling user-specific purchasing models, and/or other purchasing models 116 modeling purchasing behaviors based on one or more other factors, such as the store where the checkout aisle 200 is located, the geographic region where the store is located, temporal information (e.g., day of the week, week of the year, month of the year, season), current conditions (e.g., weather, sales, recent purchasing trends), and/or other factors. For example, the computer system 102 can identify the products that the customer will be purchasing (some of which may have been scanned and some of which may not have been scanned) and, based on those products, can apply one or more appropriate and available purchasing models 114/116 to those products to identify complementary/companion products that are not included in the identified products, but which are likely to be of interest to the customer given the identified products and the purchasing models 114/116.

From this set of complementary/companion products the computer system 102 can identify one or more products to provide as product recommendations 106 to the customer on the customer facing device. The selection of the one or more products to provide as the product recommendations 106 from among the identified set of complementary/companion products can be based on any of a variety of factors, such as the products that have a greatest corresponding confidence value (indicating a highest likelihood of being of interest to the user) and/or products that have at least a threshold level of availability (stock) via one or more preferred fulfillment channels. For example, in some instances in-store fulfillment may be a preferred channel, in which case the in-store inventory 118 can be analyzed, including identifying showroom stock 120 and backroom stock 122 for each of the set of complementary/companion products. In some instances, it may be preferable to perform in-store fulfillment using backroom stock 122 and in some instances it may be preferable to perform in-store fulfillment using showroom stock 120. From the set of complementary/companion products, the computer system 102 can eliminate those products that do not have at least a threshold level of available backroom stock 122 and/or showroom stock 120 from consideration, and may limit the recommendations 106 to products with sufficient levels of backroom 122 and/or showroom stock 120 so as to ensure fulfillment of any purchases made via the customer-facing device 208 during the checkout process.

If the customer selects one or more of the product recommendations 106 on the customer-facing device 208 to be added to the purchase, the point of sale terminal can add that product to the other products being purchased at the checkout aisle 200 and the computer system 102 can manage the selected fulfillment channel (e.g., the user may opt for different fulfillment channels, including in-store, delivery, and shipped options). For example, if an in-store fulfillment option is selected, the computer system 102 can transmit fulfillment messages to one or more team members located at or near the product inventory from which the fulfillment will be performed (e.g., at or near the backroom stock 122, at or near the showroom stock 120 for the product), which can cause the product to be retrieved by the team member and delivered to the customer at one or more designated locations (e.g., checkout aisle, in-store fulfillment area).

Figure 2A:
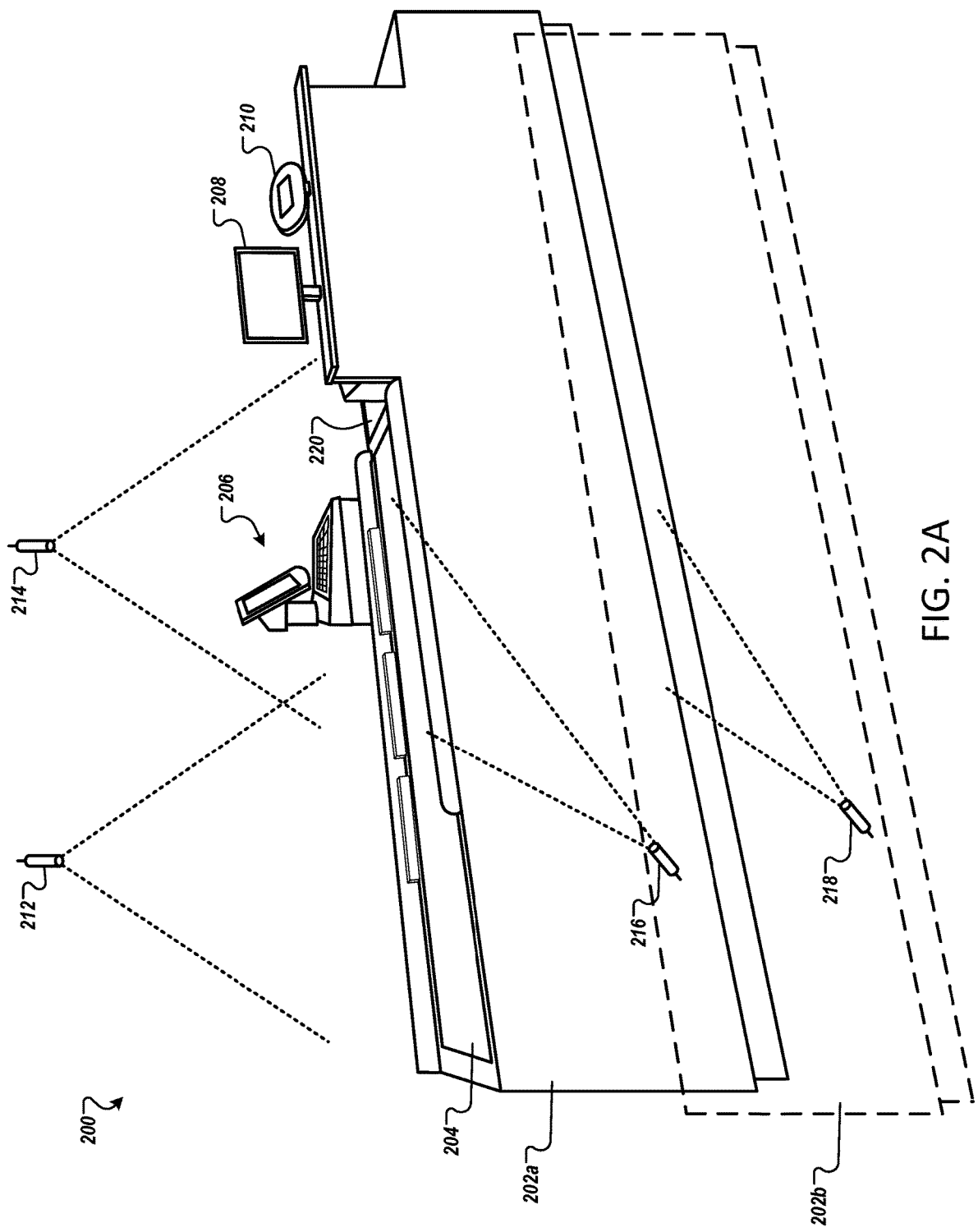
FIG. 2A is perspective view of a checkout aisle with example product sensors and an example customer device.
Figure 2B:
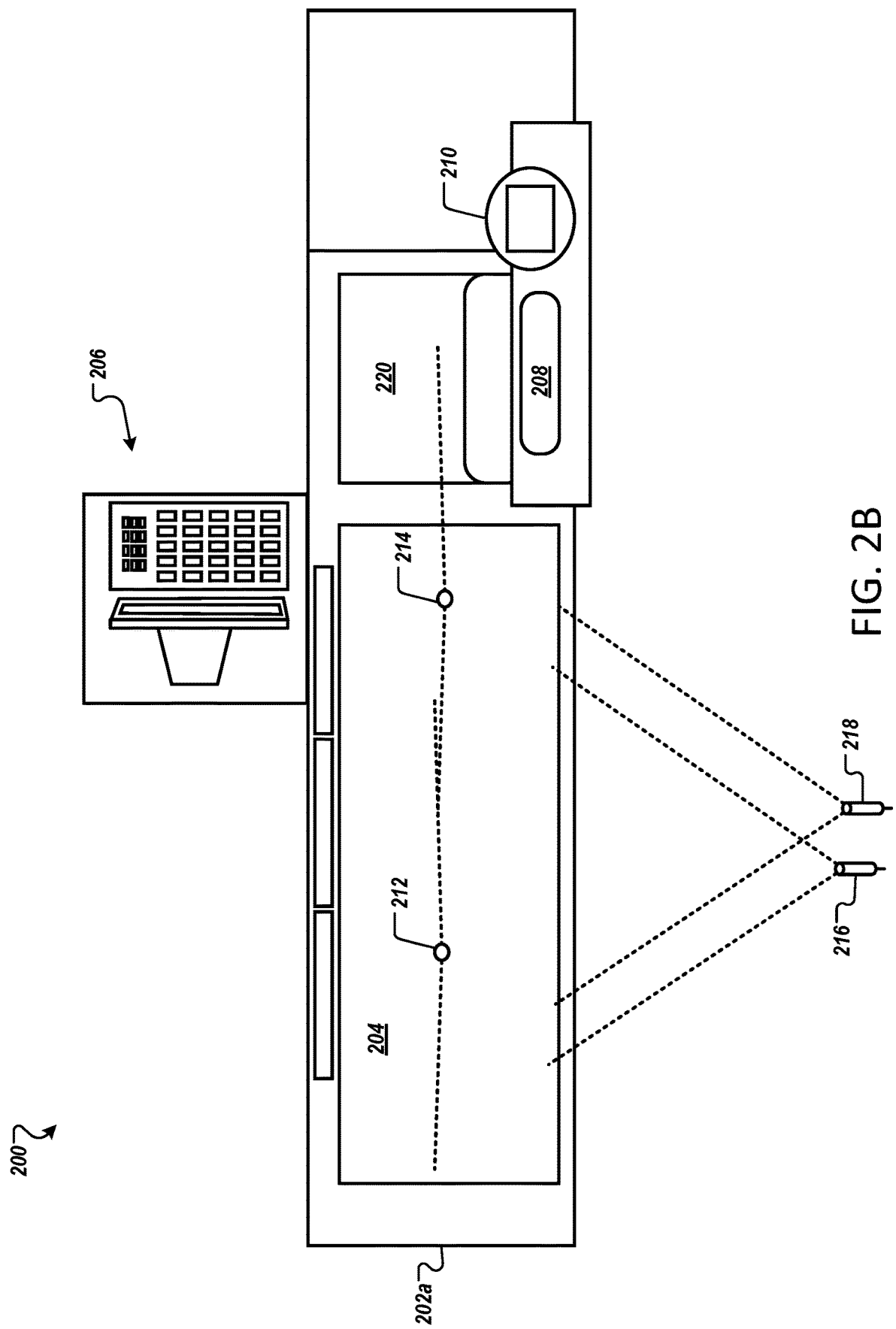
FIG. 2B is a top view of the checkout aisle with the example product sensors and the example customer device of FIG. 2A.

FIGS. 2A-2C are various views of a checkout aisle 200 with example product sensors 212-218 and an example customer device 208. Checkout aisle 200 can include a first checkout lane 202a and a second checkout lane 202b, creating a walkway between the first checkout lane 202a and the second checkout lane 202b.

The checkout lane 202a can include a conveyer belt 204, a cash register 206, the customer device 208, a payment terminal 210, upper product sensors 212 and 214, and a scanner 220. The cash register 206, payment terminal 210, scanner 220, and/or customer device 208 can collectively be a point-of-sale terminal. The second checkout lane 202b can include lower product sensors 216 and 218. The first checkout lane 202a and second checkout lane 202b can be a traditional employee run checkout lane, an express lane, a self-checkout lane, a customer service lane, or other aisle for a consumer to purchase products from a brick and mortar store.

The conveyer belt 204 can aid in moving products from a first end of the checkout lane 202a towards the cash register 206 and the scanner 220. For example, the conveyer belt 204 can be continuously moving. As another example, the conveyer belt 204 can move until an item is sensed near the cash register 206 and scanner 220, causing the conveyer belt 204 to stop moving. The conveyer belt 204 can be of varying lengths, depending on the checkout aisle. For example, a longer conveyer belt 204 can be used in a traditional, worker operated, checkout aisle, while a shorter conveyer belt 204 can be used for an express checkout aisle, or a self-checkout aisle. As another example, the conveyer belt 204 can be a simple counter that does not move, but provides a surface for a customer to place products for purchase.

The scanner 220 can be configured to identify products and provide the identified products to cash register 206. An employee, or a customer, can move products across scanner 220 for identification. For example, scanner 220 can be a barcode scanner. As another example, scanner 220 can be a RFID reader. Scanner 220 can be horizontal, vertical, or a combination of the two to aid in capturing the barcode quickly. In some embodiments, scanner 220 can also include a weight scale. In some embodiments, the scanner 220 can also include a scanner interface. For example, when a customer wants to purchase produce, the produce identifier code can be entered into the cash register and/or the scanner interface and the produce can be weighed to obtain a purchase price. As another example, the scanner interface can be used to specify a quantity of items, such as a number of produce items that cannot be scanned, or a number of items that can be scanned. For example, time may be saved if several of the same item is being purchased and the item is scanned once and then the quantity is entered.

Cash register 206 can be a computer with a touch screen, keyboard, mouse, display, and/or other means for inputting information. Cash register 206 can be configured to initiate, process, and complete transactions as well as returns and exchanges. For example, cash register 206 can record and track the products scanned by scanner 220. Cash register 206 can be configured to calculate a total purchase price as products are scanned and can calculate tax as needed. Cash register 206 can also be configured to apply sales prices, promotions, and/or coupons. In some embodiments, cash register 206 can be configured to implement customer loyalty programs (e.g., loyalty points, discounts, etc.). In some embodiments, cash register 206 can connect to other systems in a network, such as other cash registers. In some embodiments, cash register 206 can aid in managing inventory. Cash register 206 can also include a cash drawer. In some embodiments, cash register 206 can be coupled to a printer that can print receipts, rebates, and other documents.

The payment terminal 210 can be configured to interface with payment cards (e.g., credit cards, debit cards, and EBT cards) to make electronic funds transfers. For example, the payment terminal 210 can include a magnetic stripe reader, a chip reader, or near field communication device for touch payment. The payment terminal 210 can include a screen, a keypad (or a pinpad), buttons, a stylus. Payment terminal 210 can be communicably coupled to cash register 206 to transmit payment information.

The customer device 208 can be a tablet, interactive display, or other device that the customer can using during the checkout process. In some embodiments, the customer device 208 can be a touch screen. Alternatively, or in addition to the customer device 208 being a touch screen, the customer device 208 can also include a keyboard, mouse pad, number pad, stylus, or other means for inputting information. The customer device 208 can be located near payment terminal 210 to allow a customer to easily use both devices. The customer device 208 can be positioned before or after the payment terminal 210. The customer device 208 can have a landscape orientation or a portrait orientation. In some embodiments, the customer device 208 can be adjustable. For example, the customer device 208 can be moved upward or downward for ease of customer use. As another example, the customer device 208 can be adjusted to modify an angle or tilt of the customer device 208.

The upper product sensors 212 and 214 can be configured to collect product information from the first checkout aisle 202a. For example, the upper product sensors 212 and 214 can be cameras, scanners, (e.g., a barcode scanner, QR code scanner, RFID scanner), or other means for determining products. The upper product sensors 212 and 214 can be positioned above the checkout aisle 200. For example, the upper product sensors 212 and 214 can be positioned above or substantially above (e.g., linearly offset from) checkout lane 202a. The upper product sensors 212 and 214 can be positioned to collect product information from products on the conveyer belt 204. In some embodiments, the upper product sensors 212 and 214 can be in line with one another. In some cases, upper product sensors 212 and 214 can be pointed directly downward toward conveyer belt 204. In some embodiments, upper product sensor 212 can be pointed directly downward toward conveyer belt 204 and upper product sensor 214 can be pointed at an angle toward conveyer belt 204. In another embodiment, upper product sensor 214 can be pointed directly downward toward conveyer belt 204 and upper product sensor 212 can be pointed at an angle toward conveyer belt 204. In some cases, upper product sensors 212 and 214 can both be angled toward conveyer belt 204. In another embodiment, the upper product sensors 212 and 214 can be located along different axes parallel a longitudinal axis of conveyer belt 204. In some embodiments, the upper product sensor 214 can be positioned above the conveyer belt 204. The upper product sensor 214 can be pointed downward at conveyer belt 204. Alternatively, the upper product sensor 214 can be positioned at an angle toward conveyer belt 204. Upper product sensor 212 can be offset from conveyer belt 204 and be pointed to at an angle toward conveyer belt 204.

The lower product sensors 216 and 218 can be configured to collect product information from the first checkout lane 202a. For example, the lower product sensors 216 and 218 can be configured to collect product information from a shopping cart 222 located in the first checkout lane 202a. As another example, the lower product sensors 216 and 218 can be positioned to collect product information from a lower rack 224 of the shopping cart 222. As yet another example, the lower product sensors 216 can be configured to collect product information from conveyer belt 204. The lower product sensors 216 and 218 can be cameras, scanners (e.g., a barcode scanner, QR code scanner, RFID scanner), or other means for determining product information. The lower product sensors 216 and 218 can be positioned near the first checkout lane 202a. For example, the lower product sensors 216 and 218 can be coupled to second checkout lane 202b. In some embodiments, the lower product sensors 216 and 218 can be vertically aligned with one another. In another example, the lower product sensors 216 and 218 can be vertically offset from one another. The lower product sensors 216 and 218 can be positioned to face checkout aisle 202a horizontally. In another example, the lower product sensors 216 and 218 can be positioned to angle downwards. Optionally, only one of the lower product sensor 216 and 218 is angled downwards.

Figure 3:
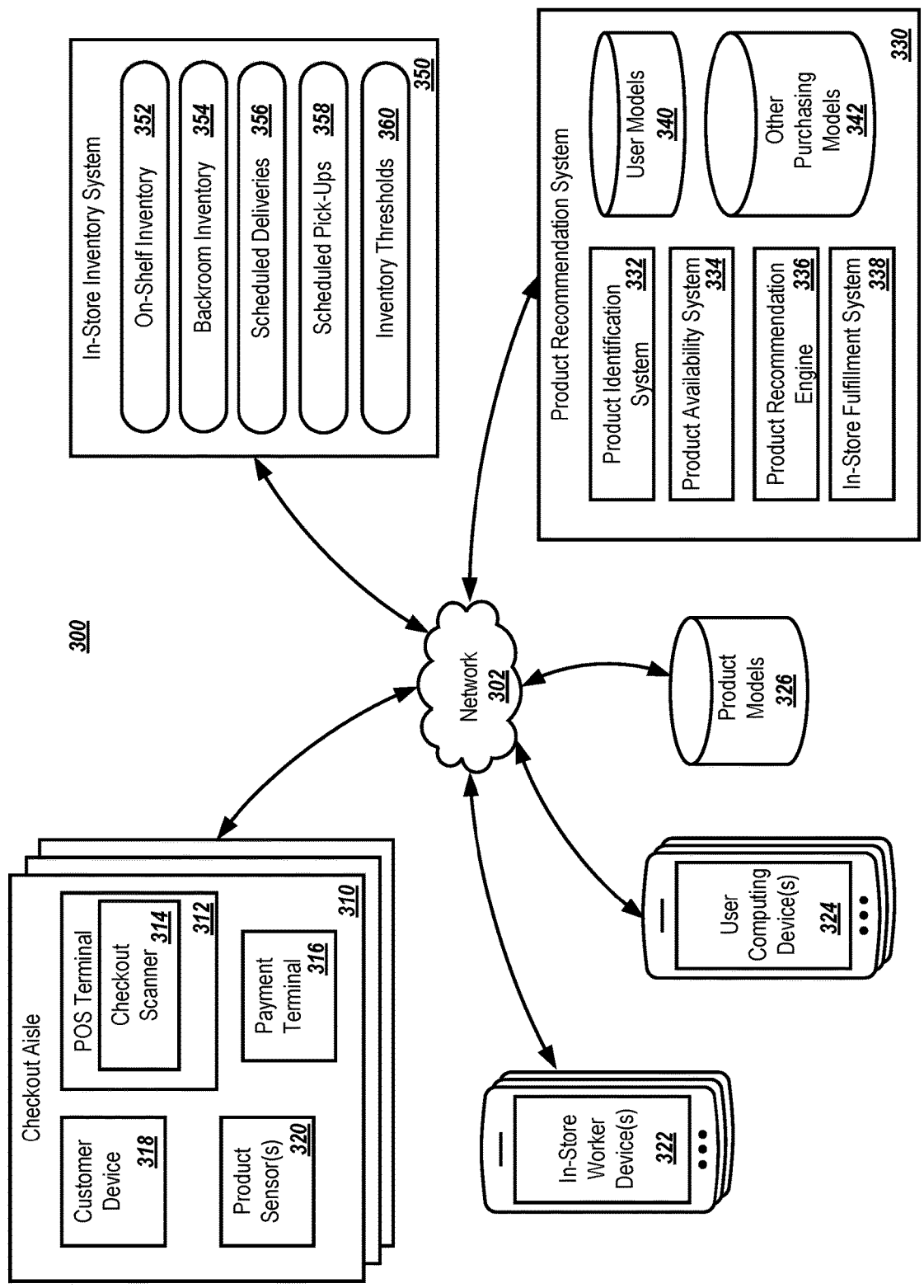
FIG. 3 is a conceptual diagram of an example system for providing product recommendations and in-store fulfillment.

FIG. 3 is a conceptual diagram of an example system 300 for providing product recommendations and in-store fulfillment. The system 300 can include a network 302, a checkout aisle 310, in-store worker device(s) 322, user computing device(s) 324, product models 326, product recommendation system 330, and in-store inventory system 350.

The network 302 can include, for example, a mobile data network (e.g., 4G LTE network) to which the in-store worker device 322 and/or the user computing device 324 subscribes, cellular networks, other wireless networks (e.g., open/public Wi-Fi networks within a store), and/or combinations thereof.

The checkout aisle 310 can include a POS terminal 312 with a checkout scanner 314, and a payment terminal 316. POS terminal 312 can be similar to cash register 206 described above with regard to FIGS. 2A-2C. Checkout scanner 314 can provide means for adding products to a virtual cart, such as during a checkout process. Checkout scanner 314 can be configured to scan QR codes, barcodes, RFID tags, and/or other means for identifying a product. Payment terminal 316 can be communicably connected to POS terminal 312 to permit a user to pay for the products in cart at the POS terminal. Payment terminal 316 can be configured to receive payment information and securely transmit payment information. Payment terminal 316 can receive payment information via a magnetic strip on a card, a chip embedded in a card, and/or near-field communication with a contactless card that contains a computer chip and an antenna. Payment can receive payment via several payment methods (e.g., debit card, credit card, EBT, Apple Pay, and others).

Checkout aisle 310 can also include a customer device 318. Customer device 318 can be similar to customer device 208 described above with respect to FIGS. 2A-2C. Customer device 318 can be configured to permit a customer to add products to a transaction before, during, or after physical products have been scanned by the checkout scanner 314. For example, the customer device 318 can display product recommendations received from the product recommendation system 330 to the customer during the checkout process. This process is described in further detail with regard to FIGS. 4-6.

Checkout aisle 310 can also include one or more product sensors 320. The product sensors can be configured to collect product signals from the checkout aisle 310. For example, the product sensors 320 can be cameras, scanners, (e.g., a barcode scanner, QR code scanner, RFID scanner), or other means for collecting product signals. In some embodiments, different product sensors 320 can collect separate product signals for each product sensor 320. In another embodiment, different product sensors 320 can collect a single collective product signal.

In-store worker device(s) 322 can be carried by workers throughout the store. The in-store worker device(s) 322 can be configured to communicate with workers remotely. In some embodiments, the in-store worker device(s) 322 can be a mobile device, a walkie-talkie, a tablet, personal assistant device (PDA), or other portable device. The in-store worker device(s) 322 can receive notifications, messages, and other information. In some embodiments, the in-store worker device(s) 322 can transmit notifications, messages, and other information to a central system, or other in-store worker device(s) 322. In some embodiments, the in-store worker device(s) 322 can scan products, search for products, and provide product information.

User computing device(s) 324 can be a mobile device, tablet, personal assistant device (PDA), walkie talkie, or other portable device carried into the store by a customer. In some embodiments, user computing devices 324 can be configured to identify the customer when the customer enters the store. For example, user computing devices 324 can transmit a message to a store server when the customer passes the doors. In some embodiments, user computing devices 324 can have an application downloaded for the store. For example, the application can be configured to provide rewards, loyalty program information, coupons, user information, or other information related to the store.

Product models 326 can include product information. For example, product models 326 can include 3D models of products. The 3D models can be used to identify products using camera product signals. Accordingly, products can be identified from the 3D model regardless of the angle of the product on the conveyer belt 204. In another embodiment, product models 326 can store information to identify products. For example, products can be identified by a barcode, RFID tag, QR code, or other marking on the product. In some embodiments, product models 326 are 2D images of the products. Optionally, multiple 2D images of each product can be included in product models 326. For example, 2D images of each product from different angles can be included in product models 326, such that products can be identified from different angles.

Product recommendation system 330 can include a product identification system 332, a product availability system 334, a product recommendation engine 336, an in-store fulfillment system 338, user models 340, and other purchasing models 342. Operation of product recommendation system 330 will be described in further detail with respect to FIGS. 4-7.

Product identification system 332 can be configured to identify products from the product signals. For example, product identification system 332 can receive product signals from the product sensors 320 and access product models 326 to identify products based on the product signals. The product signals may be image or video signals that capture products in the checkout aisle. The captured image or video signals can then be compared to 2D or 3D models of various products in product models 326. Product identification system 332 can use this comparison to determine which products the customer is intending on purchasing. Such products can be on the conveyer belt, in the cart, or on a lower rack of the cart. In some embodiments, the product identification system 332 can determine a probability of accuracy for each identified product. In another embodiment, the product identification system 332 can determine the likelihood that products are hidden. For example, the product identification system 332 may identify a product, but determine that the height of the product is greater than normal, which may indicate that the product is sitting on top of another product. Therefore, the product identification system 332 may attempt to determine the hidden product based on the inaccuracies of identified products.

In some embodiments, product identification system 332 can also identify products scanned by checkout scanner 314.

The product identification system 332 can determine which products the customer has in their cart. For example, the product identification system 332 can determine which products have been scanned and added to the transaction and which products are still waiting to be scanned and added to the transaction. The combination of these products can be the contents of the customer's cart.

Product availability system 334 can communicate with the in-store inventory system 350 to determine product availability. For example, the product availability system 334 can determine availability of a product by compiling on-shelf inventory 352 and backroom inventory 354 to determine a current inventory of the product. Schedule deliveries 356 can be added to determine if or when new products will be delivered. If the scheduled delivery has been received, but not added to the backroom inventory, or if the scheduled delivery is going to arrive soon (e.g., in less than an hour, in a few hours, or later today) the inventory of the delivery may be added to the current inventory count. If the scheduled delivery is not going to arrive soon (e.g., substantially later today, tomorrow, in a few days, next week, etc.), the scheduled deliveries 356 may not be added to the current inventory count. In some embodiments, the product availability system 334 can take into account scheduled pick-ups 358. For example, if products have been ordered for in-store pick up, but have not yet been picked up. Such items may be removed from a current inventory. In some embodiments, the product availability system 334 may use inventory thresholds 360 to determine if the product is considered available or unavailable. For example, if the current inventory estimate is above the inventory threshold 360, the product can be considered available. If the current inventory estimate is below the inventory threshold 360, the product can be considered unavailable.

Product recommendation engine 336 can determine one or more product recommendations to be provided on the customer facing device 318 based on any of a variety of factors, such as the products identified by the product identification system 332, the products that are determined to be available as determined by the product availability system 334, and/or purchasing models (e.g., user models 340, other purchasing models 342) that are used to identify products that are likely to be of interest to the customer (and not yet contained in the customer's collection of products to be purchased, regardless of whether they have already been scanned). The product recommendation engine 336 can identify products that are likely to be of interest to the user, given the current composition of products contained in the customer's collection of products for purchase and/or previous purchasing behavior of the user. The product recommendation engine 336 can also can aim to avoid identifying products that the customer has already retrieved for purchase during the current shopping trip. The product recommendation engine 336 can additionally limit the recommendations to those products that are currently available via one or more fulfillment channels, and may prioritize products based on availability via one or more preferred fulfillment channels (e.g., system-determined preference, user-identified preference).

In-store fulfillment system 338 can provide fulfillment of products added to a transaction from the customer device 318. For example, when a product is added to the transaction using customer device 318, the customer can select in-store fulfillment. In some embodiments, the in-store fulfillment system 338 can communicate with in-store worker device(s) 322 to notify workers of a product for in-store fulfillment. In some embodiments, in-store fulfillment system 338 can maintain a map of the store, with the location of all products. Operation of the in-store fulfillment system 338 will be described in further detail with respect to FIGS. 8 and 9.

User models 340 can generate purchasing trends and/or models for a plurality of identified users. For example, each identified user can have a unique user model. Such models can be based on purchase history of the user. For example, the frequency of a product being purchased can be used to determine purchasing trends. Frequency can be quantified as every purchase, most purchases, some purchases, rarely purchases, etc. Frequency can also be quantified as multiple times a week, once a week, once a month, every few months, a few times a year, yearly, etc. As another example, the type of products purchased can be used to determine purchasing trends. Types of products can include organic, all-natural, vegetarian, brand name, off-brand, reduced price products (e.g., products that are on sale, have a coupon, have a promotion, etc.), etc. In some embodiments, the user models 340 can also monitor products frequently bought together. Example of products frequently bought together can include cereal and milk, sliced cheese and sliced meat, s'mores ingredients, meal ingredients (e.g., tacos, spaghetti, chicken alfredo, breakfast items, etc.), etc. These factors can be used to create unique models for each user. In some embodiments, the user models 340 can differentiate different users on the same account. For example, a single store account may be used by different family members. Accordingly, the user models 340 can be uniquely created for each member. Alternatively, the user models 340 can be based on a single account, without modifications for different users.

Other purchasing models 342 can generate purchasing trends and/or models based on general customer purchases. For example, the purchasing trends described above with respect to the user models 340 can also be used by the other purchasing models 342. However, the other purchasing models 342 can be based on all customers, instead of individual customers. Therefore, when a user is not identified, the other purchasing models 342 can be used. In some embodiments, the other purchasing models can take additional purchasing characteristics into consideration. For example, time of day, day of the week, holidays, seasons, weather, and/or events in the area can be used to determine purchasing trends and/or models. In some embodiments, other purchasing trends 342 can create unique user models based on user profiles. For example, user profiles can include families, vegans, vegetarians, college students, young professionals, retirees, athletes, body builders, families with young children (e.g., babies, toddlers, preschoolers, etc.), or other user profiles that define unique purchasing trends.

In-store inventory system 350 can include on-shelf inventory 352, backroom inventory 354, scheduled deliveries 356, scheduled pick-ups 358, and inventory thresholds 360.

On-shelf inventory 352 can maintain a count for the inventory of products that are currently on the shelf at the store. For example, once a product is removed from backroom inventory 354, it is added to on-shelf inventory 352. As another example, a product may go directly to on-shelf inventory 352. Such products can include baked goods that are made at the store, low inventory items, specialty items, etc. Additionally, once products are added to a transaction, and the transaction has been completed (i.e., paid for), the products are removed from on-shelf inventory 352. In some embodiments, the on-shelf inventory 352 can also determine an estimate of inventory that has left the shelves, but has not been purchased. Such an estimate can be established based on purchasing trends. For example, purchasing trends can be based on time of day, day of the week, season, or other factors. Purchasing trends can be based on a number of items or a percentage of items that are likely to have been removed. In some embodiments, the on-shelf inventory 352 can also take into account misplaced items, such as items that are put back in the wrong location by people. Misplaced items can be estimated by a number of items or a percentage of items that may have been misplaced. In some embodiments, movement of products onto the shelf can be input by a worker via in-store worker device(s) 322. In another embodiment, movement of products can be determined by tags, barcodes, or markings on products, or crates of products, which can be automatically sensed by scanners near the backroom doors.

Backroom inventory 354 can maintain a count for the inventory of products that are currently on in a backroom of the store. For example, once a product is delivered to the store, it can be added to the backroom inventory 354. Once a product is moved to the shelves, the product can be removed from backroom inventory 354. In some embodiments, online orders can be removed from backroom inventory 354. For example, online orders for shipping as well as online orders for in-store pick up can be removed directly from backroom inventory 354. In another embodiments, some products are removed from backroom inventory 354 upon purchase. For example, larger items or expensive items, such as furniture, TVs, electronics, building supplies, etc. can be removed directly from the backroom inventory 354. In some embodiments, movement of products into the backroom inventory 352 can be input by a worker via in-store worker device(s) 322. In another embodiment, movement of products can be determined by tags, barcodes, or markings on products, or crates of products, which can be automatically sensed by scanners near the backroom doors (e.g., into and out of the backroom).

Scheduled deliveries 356 can monitor upcoming deliveries. For example, scheduled deliveries 356 can include deliveries that are on a fixed schedule. Scheduled deliveries 356 can also include irregular deliveries that are not on a fixed scheduled. In some embodiments, deliveries are scheduled automatically. In another embodiments, deliveries are scheduled by employees of the store.

Scheduled pick-ups 358 can monitor schedule pick-ups. For example, scheduled pick-ups 358 can include online orders that are scheduled for in-store pick-up. As another example, scheduled pick-ups 358 can include orders that other stores in the area need.

Inventory thresholds 360 can be thresholds used to determine if a product is considered available or unavailable. In some embodiments, each product can have an individual threshold. In another embodiment, products can have a threshold based on the product type (e.g., produce, beverages, dry goods, etc.). Inventory thresholds 360 can be used to ensure a product can be quickly found and delivered to a customer if the customer selects in-store fulfillment. For example, inventory thresholds 360 can account for misplaced products, products that are in other customer carts and off the shelves but not yet purchased, and discrepancies in inventory.

Figure 4:
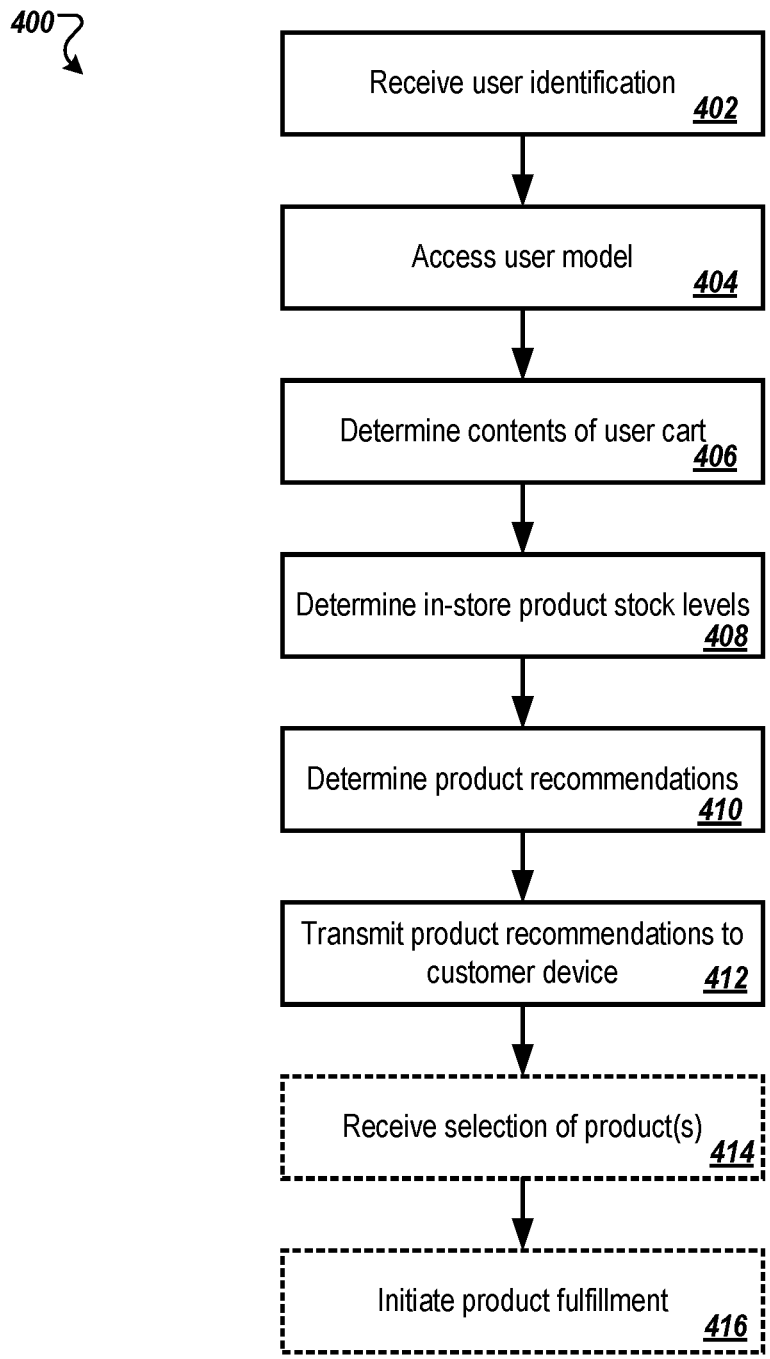
FIG. 4 is a flowchart of an example process for providing product recommendations to an identified user.

FIG. 4 is a flowchart of an example process 400 for providing product recommendations to an identified user using the product recommendation system 330.

The product recommendation system 330 can receive user identification (402). In some embodiments, user identification can be received by product recommendation system 330 from customer device 318. For example, user identification at customer device 318 can be a phone number, email, name, account number, loyalty number, or other method of identifying a user and/or loyalty account that is entered into the customer device 318. As another example, user identification at customer device 318 can be received by communicating with the user computing device 324. More specifically, user computing device 324 can present a barcode, QR code, or other scannable code to the customer device 318 such that the customer device 318 can determine a user identity. In some embodiments, user identification can be received by payment terminal 316. For example, a payment card can be swiped, inserted, or placed in proximity to payment terminal 316. More specifically, a payment card (e.g., debit card, credit card, gift card, store card, EBT, etc.) can be inserted before or during the transaction (e.g., predip) and the user can be identified based on the payment card.

The product recommendation system 330 can access user model 340 (404). In some embodiments, the specific user model for the identified user can be accessed. In another embodiment, the user model 340 that is accessed can be a more generic user model that the identified user fits into. By accessing user model 340, product recommendation system 330 can cater product recommendations to the identified user, as will be described in further detail below.

The product identification system 332 of the product recommendation system 330 can determine contents of a user's cart (406). The product recommendation system 330 can use product signals from the product sensor(s) 320 and the product models 326 to determine the contents of the user's cart. In some embodiments, the product identification system 332 can also identify products scanned with checkout scanner 314. Determining contents of the user's cart will be described in further detail with respect to FIG. 6.

The product availability system 334 of the product recommendation system 330 can determine in-store product stock levels (408). The product availability system 334 can communicate with in-store inventory system 350 to determine product stock levels. Determining in-store product stock levels will be described in further detail with respect to FIG. 7.

The product recommendation engine 336 of the product recommendation system 330 can determine product recommendations (410). For example, the product recommendation engine 336 identify one or more products (not yet included in the user's cart) that are likely to be of interest to the user using the user model for the identified user and the identified contents of the cart, and can limit the product recommendations to those product with at least threshold levels of in-store stock to permit for reliable in-store fulfillment, if the product recommendation is selected.

The product recommendation system 330 can transmit product recommendation to customer device 318 (412). In some embodiments, product recommendations can be transmitted as recommendations are determined. In another embodiment, product recommendations can be transmitted after all recommendations have been determined. For example, product recommendations can be transmitted in an order of priority. The order of priority can be based on relevancy. In some embodiments, the product recommendations can be transmitted sequentially after a time delay. For example, a new product recommendation can be transmitted every 5-60 seconds. As another example, a new product recommendation can be transmitted after the user has interacted with the current product recommendation. Specifically, the customer device 318 may receive a selection of a product that was recommended, an indication to view the previous product recommendation, an indication to view the next product recommendation, or an indication to stop viewing product recommendation.

Optionally, the product recommendation system 330 can receive a selection of product(s) (414) and initiate product fulfillment (416). The customer device 318 can receive products selected by the customer. In some embodiments, the products received can be one of the product recommendations that was transmitted to the customer device. In another embodiment, any product can be selected, regardless of the product recommendations. In some embodiments, the selection of products can be limited to products that are considered available based on inventory stock levels and inventory thresholds 360. The in-store fulfillment system 338 can initiate product fulfillment, which will be described in greater detail with respect to FIGS. 8 and 9.

Figure 5:
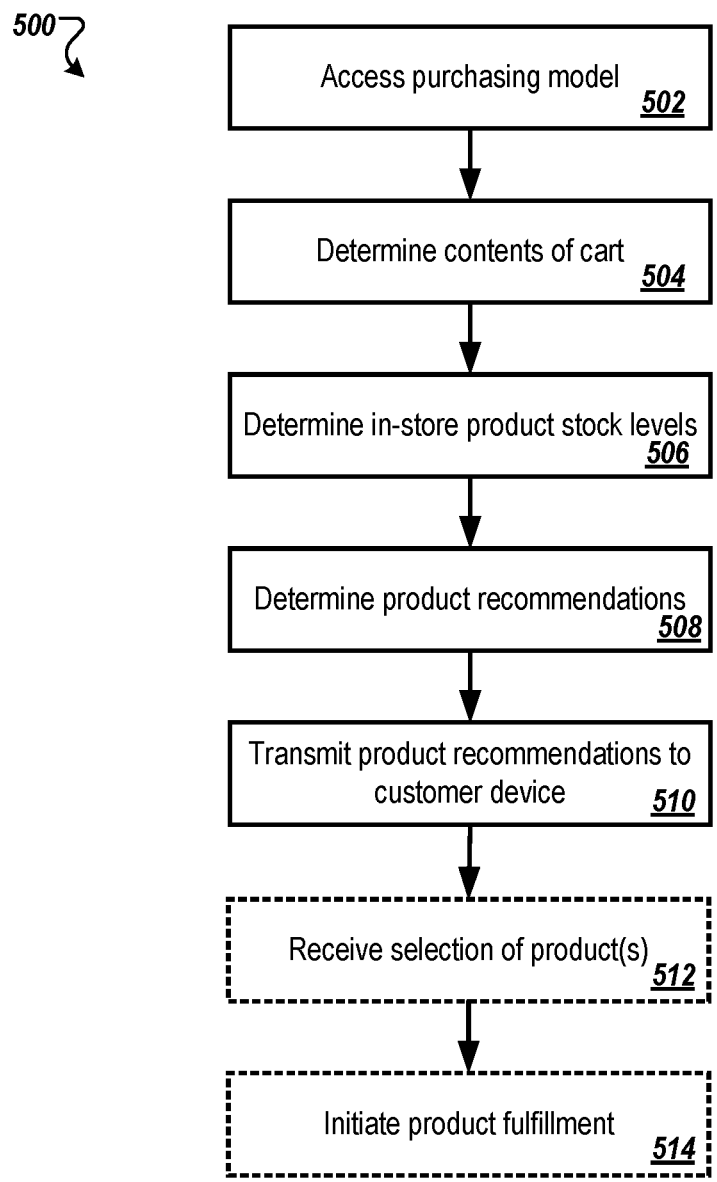
FIG. 5 is a flowchart of an example process for providing product recommendations to an unidentified user.

FIG. 5 is a flowchart of an example process 500 for providing product recommendations to an unidentified user using the product recommendation system 330.

The product recommendation system 330 can access purchasing model 342 (502). In some embodiments, generic purchasing models 342 can be access for unidentified users. For example, time of day, day of the week, holidays, seasons, weather, and/or events in the area can be used to determine which purchasing model to use. In some embodiments, the product recommendation system 330 can determine a user profile of the customer based on the contents of the user's cart. For example, user profiles can include families, vegans, vegetarians, college students, young professionals, retirees, athletes, body builders, families with young children (e.g., babies, toddlers, preschoolers, etc.), or other user profiles that define unique purchasing trends based on products purchased. By accessing user model 340, product recommendation system 330 can cater product recommendations to the unidentified user, as will be described in further detail below.

The product recommendation system 330 can determine contents of a user's cart (504) and determine in-store product stock levels (506). Determining the contents of the user's cart (504) and determining in-store product stock levels (506) can be substantially similar to determining the contents of the user's cart (406) and determining in-store product stock levels (408) as described with respect to FIG. 4.

The product recommendation system 330 can determine product recommendations (508). For example, the product recommendation engine 336 identify one or more products (not yet included in the user's cart) that are likely to be of interest to the user using one or more relevant purchasing models (e.g., identified based on the store, the region where the store is located, temporal information, current conditions/trends, and/or other factors) and the identified contents of the cart, and can limit the product recommendations to those product with at least threshold levels of in-store stock to permit for reliable in-store fulfillment, if the product recommendation is selected.

The product recommendation system 330 can transmit product recommendations to customer device 318 (510). Transmitting product recommendations to customer device 318 (510) can be substantially similar to transmitting product recommendations to customer device 318 (412) as described with respect to FIG. 4.

Optionally, the product recommendation system 330 can receive a selection of product(s) (512) and initiate product fulfillment (514). Receiving a selection of products (512) and initiating product fulfillment (514) can be substantially similar to receiving a selection of products (414) and initiating product fulfillment (416) as described with respect to FIG. 4.

Figure 6:
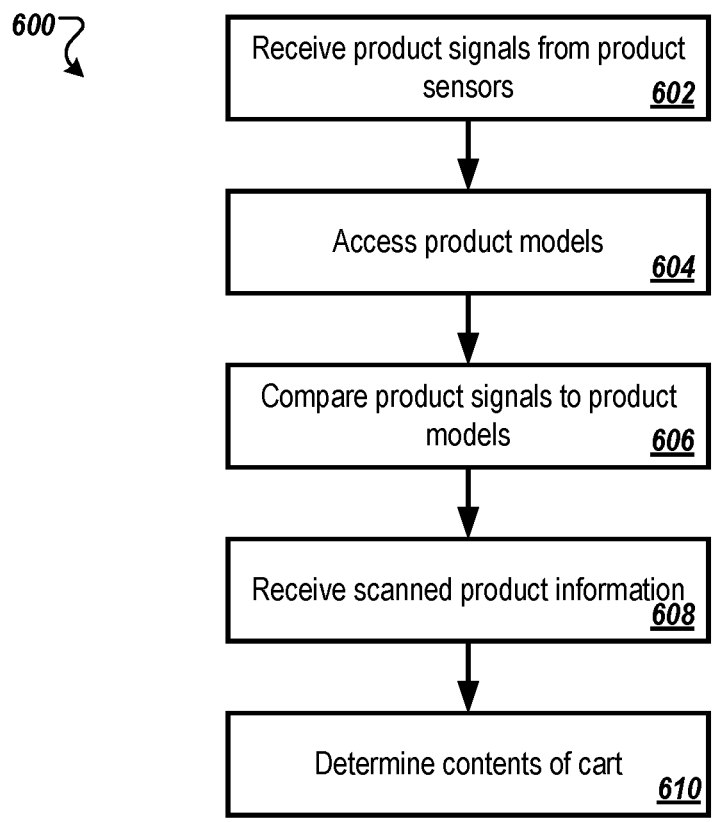
FIG. 6 is a flowchart of an example process for determining contents of a customer cart.

FIG. 6 is a flowchart of an example process 600 for determining contents of a customer cart using the product identification system 332 of the product recommendation system 330.

Product identification system 332 can receive product signals from product sensors 320 (602). The product signals 320 can be images, video, codes (e.g., a barcode or QR code), RFID signals, or other signals received from product sensors 320. In some embodiments, the product identification system 332 receives an individual product signal from each product sensor 320. In another embodiment, the product identification system 332 receives a single collective product signal from the product sensors 320. In some embodiments, product identification system 332 continuously receives product signals from product sensors 320. In another embodiment, product identification system 332 can periodically receive product signals from product sensors 320 (e.g., every 10 seconds, 20 seconds, 30 seconds, 60 seconds, 90 seconds, etc.).

In some embodiments, the product identification system 332 can begin receiving product signals upon initiation of a new transaction. For example, product sensors 320 may be activated upon a checkout lane opening (e.g., an employee logs into POS terminal 312, a user starts interacting with a shelf-checkout POS terminal, etc.). As another example, the product sensors 320 may be activated when the first item of a new transaction is scanned with checkout scanner 314.

In some embodiments, the product sensors 320 are continuously gathering product signals, but product identification system 332 begins receiving product signals upon initiation of a new transaction. For example, product identification system 332 may be activated upon a checkout lane opening (e.g., an employee logs into POS terminal 312, a user starts interacting with a shelf-checkout POS terminal, etc.). As another example, the product identification system 332 may be activated when the first item of a new transaction is scanned with checkout scanner 314.

Product identification system 332 can access product models (604) and compare product signals to the product models 326 (606). By comparing product signals to the product models 326, products can be identified. The received signals can be compared to 2D or 3D models of various products in product models 326. Product identification system 332 can use this comparison to determine which products the customer is intending on purchasing. Such products can be on the conveyer belt, in the cart, or on a lower rack of the cart. In some embodiments, the product identification system 332 can determine a probability of accuracy for each identified product. In another embodiment, the product identification system 332 can determine the likelihood that products are hidden. For example, the product identification system 332 may identify a product, but determine that the height of the product is greater than normal, which may indicate that the product is sitting on top of another product. Therefore, the product identification system 332 may attempt to determine the hidden product based on the inaccuracies of identified products. In some embodiments, the product identification system 332 can identify a divider positioned between products of different customers.

Product identification system 332 can receive scanned product information (608) and determine contents of the user's cart (610). Using the scanned product information received from the checkout scanner 314 and POS terminal 312, product identification system can determine which products have already been added to a transaction, and therefore are considered part of the user's cart. The product identification system 332 can use the comparison of the product signals to the product models 326 to determine products intended to be added to the transaction, and therefore are considered part of the user's cart.

Figure 7:
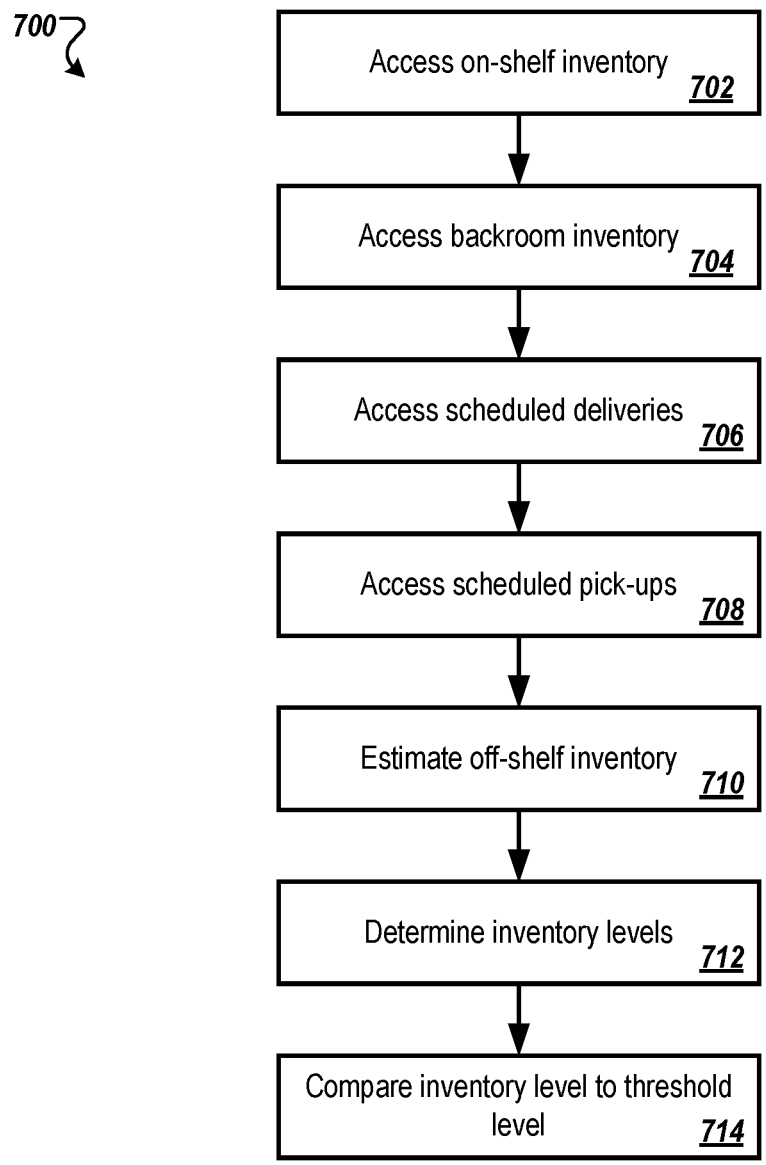
FIG. 7 is a flowchart of an example process for evaluating an inventory level.

FIG. 7 is a flowchart of an example process 700 for evaluating an inventory level using the product availability system 334 of the product recommendation system 330.

The product availability system 334 can access on-shelf inventory 352 (702), access backroom inventory 354 (704), access scheduled deliveries 356 (706), and access scheduled pick-ups 358 (708). The on-shelf inventory 352 and backroom inventory 354 can be added together to determine a preliminary inventory level. If the scheduled deliveries 356 are arriving soon (e.g., in the next hour, in a few hours, the same day), the scheduled deliveries may be added to the preliminary inventory level. If the scheduled deliveries 356 are not arriving soon (e.g., tomorrow, later in the week, in a few weeks, etc.), the scheduled deliveries 356 may not be added to the preliminary inventory level. The scheduled pick-ups 358 can be removed from the preliminary inventory level. In some embodiments, if the scheduled pick-ups 358 are scheduled after the scheduled deliveries 356, the scheduled pick-ups 358 may not be removed from the preliminary inventory level.

The product availability system 334 can estimate off-shelf inventory (710). Off-shelf inventory can be an estimate of products that have been removed from the shelves, but have not yet been purchased. In some embodiments, the products are in carts or baskets of customers. The off-shelf inventory estimate can be established based on purchasing trends. For example, purchasing trends can be based on time of day, day of the week, season, or other factors. Purchasing trends can be based on a number of items or a percentage of items that are likely to have been removed. In another embodiment, these products can be misplaced products that have been put on the incorrect shelf. Misplaced items can be estimated by a number of items or a percentage of items that may have been misplaced. The off-shelf inventory estimate can be removed from the preliminary inventory level.

The product availability system 334 can determine inventory levels (712). The product availability system 334 can determine inventory levels based on the on-shelf inventory 352, the backroom inventory 354, the scheduled deliveries 356, the scheduled pick-ups 358, and the estimated off-shelf inventory.

The product availability system 334 can compare the inventory level to a threshold level (714). The inventory level determined can be compared to the inventory thresholds 360. In some embodiments, each product can have an individual threshold. In another embodiment, products can have a threshold based on the product type (e.g., produce, beverages, dry goods, etc.). Inventory thresholds 360 can be used to ensure a product can be quickly found and delivered to a customer if the customer selects in-store fulfillment. For example, inventory thresholds 360 can account for misplaced products, products that are in other customer carts and off the shelves but not yet purchased, and discrepancies in inventory. If the inventory level is above the inventory threshold, the product is considered available. If the inventory level is below the inventory threshold, the product is considered unavailable.

Figure 8:
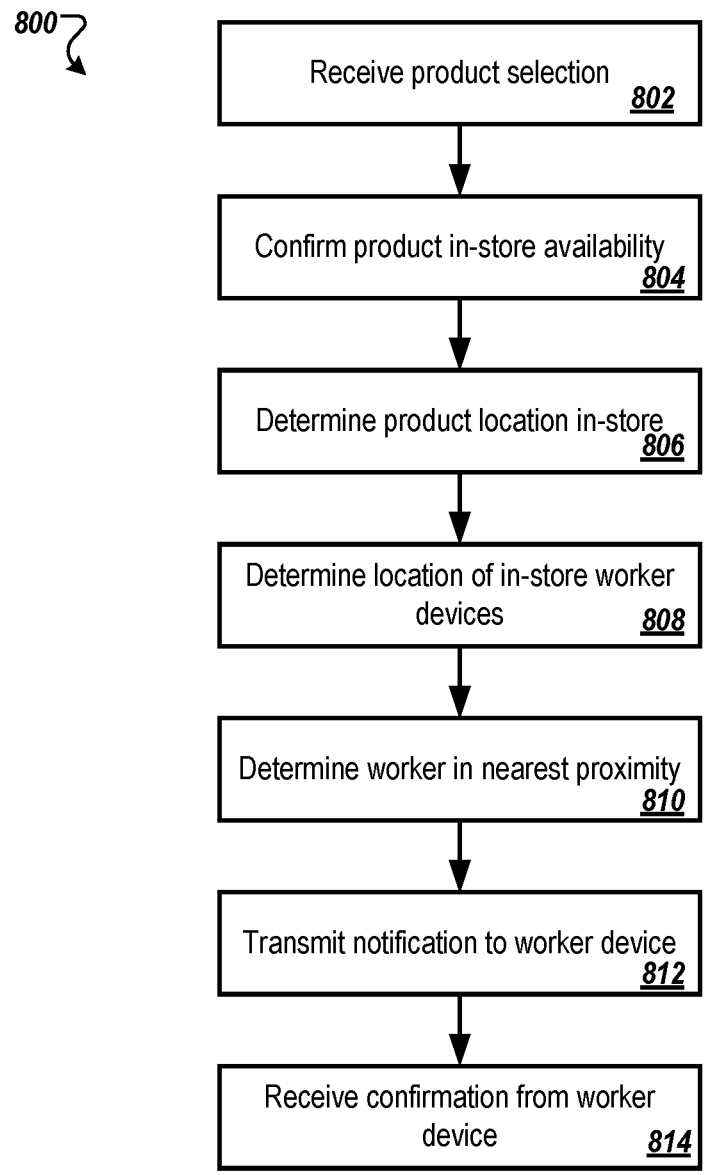
FIG. 8 is a flowchart of an example process for providing fulfillment of a product.
Figure 9:
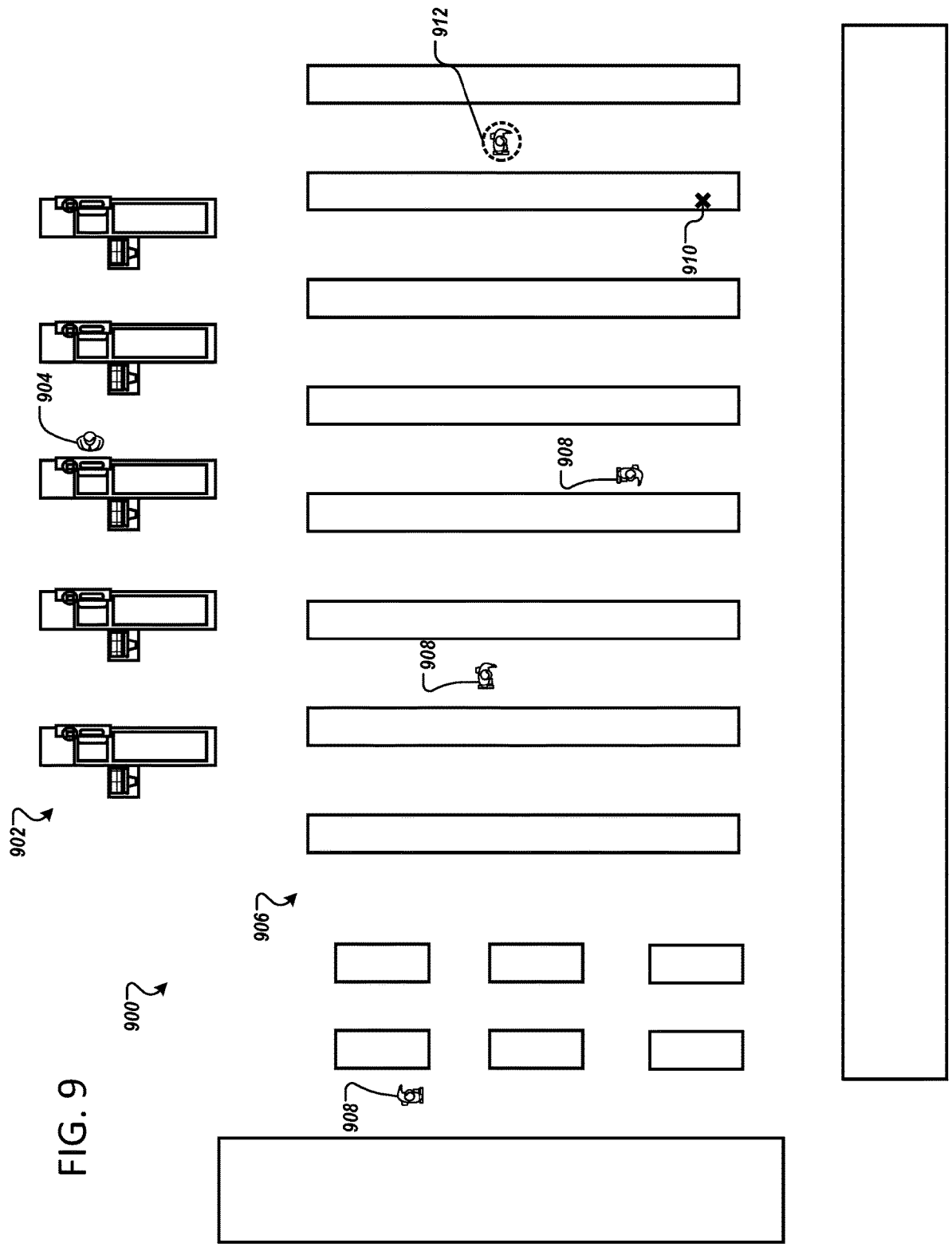
FIG. 9 is a top view of an example store layout.

FIG. 8 is a flowchart of an example process 800 for providing fulfillment of a product using the in-store fulfillment system 338 of the product recommendation system 330. FIG. 9 is a top view of an example store 900 layout.

Referring to FIGS. 8 and 9, the in-store fulfillment system 338 can receive product selection (802) from customer device 318. The customer 904 can select the product on the customer device 318 located in the checkout area 902.

The in-store fulfillment system 338 can confirm product in-store availability (804). In some embodiments, the in-store fulfillment system 338 can communicate with the product availability system 334 to determine the selected product is in stock. In another embodiment, the product availability system 334 may have predetermined the product is available. In yet another embodiment, only available products can be selected for in-store fulfillment.

The in-store fulfillment system 338 can determine product location in-store (806). The in-store fulfillment system 338 can have a layout of the product shelves 906. In some embodiments, product shelves 906 can include grocery, clothing, electronics, furniture, home goods, sporting goods, etc. In some embodiments, product shelves 906 can include refrigerators and/or freezers. The in-store fulfillment system 338 can determine product location 910.

The in-store fulfillment system 338 can determine a location 908 of in-store worker devices (808). The in-store worker device 322 can include GPS tracking and communicate with in-store fulfillment system 338 such that in-store fulfillment system 338 can determine a location 908 of in-store worker device 322. In some embodiments, the in-store fulfillment system 338 can transmit a location request to in-store worker devices 322 and receive a GPS location in response. In another embodiment, the in-store fulfillment system 338 can continuously or periodically receive location information from in-store worker devices 322.

The in-store fulfillment system 338 can determine a worker in nearest proximity 912 (810). In some embodiments, the worker in nearest proximity 912 can be determined based on the in-store worker device 322 that is physically closest to the product location 910, regardless of shelves, displays, and/or other physical barriers. In another embodiment, the work in nearest proximity 912 can be determined based on the in-store worker device 322 that has the shortest path to the product location 910, taking into consideration shelves, displays, and/or other physical barriers. In yet another embodiment, the worker in nearest proximity 912 can be determined based on the in-store worker device that has the most direct route to the product location 910 and the customer 904.

In some embodiments, multiple products can be selected for in-store fulfillment at the same time. For example, a customer 904 may select multiple products for in-store fulfillment. As another example, multiple customers may request products for in-store fulfillment. In such an embodiment, the in-store fulfillment system 338 can determine the worker in nearest proximity 912 based on a route that is determined to be the most efficient to collect all the products and deliver the products to the customers. Alternatively, multiple workers can be selected to retrieve the products.

The in-store fulfillment system 338 can transmit a notification to an in-store worker device 322 (812). The notification can be transmitted to the in-store worker device 322 of the worker in nearest proximity 912. In some embodiments, the notification is a request to retrieve a selected product. For example, the notification can include product information (e.g., name, brand, image, color, size, etc.), a location of the product (e.g., aisle, department, etc.), a checkout aisle of the customer, a designated delivery location (e.g., customer service, electronics, cosmetics, pharmacy, or another department, a marked area for in-store fulfillment, etc.), and/or a request for confirmation of availability. In some embodiments, all information can be transmitted at once. In another embodiment, the information is transmitted upon receipt of a confirmation that the worker is available to complete the in-store fulfillment. In some embodiments, the notification includes basic information (e.g., product name) and additional information can be retrieved upon selection of various links in the notification.

The in-store fulfillment system 338 can receive confirmation from the in-store worker device 322 (814) of the worker in nearest proximity 912. For example, the worker 908 can indicate that they are available to collect the product for in-store fulfillment by transmitting a notification that is received by the in-store fulfillment system. Optionally, the in-store fulfillment system 338 can receive a decline notification. For example, the worker 908 may indicate on the in-store worker device 322 that they are currently occupied assisting another customer. Accordingly, the in-store fulfillment system 338 can determine a new worker in nearest proximity and transmit a notification to the new in-store worker device 322.

FIG. 10 is a schematic diagram that shows an example of a computing system 1000. The computing system 1000 can be used for some or all of the operations described previously, according to some implementations. The computing system 1000 includes a processor 1010, a memory 1020, a storage device 1030, and an input/output device 1040. Each of the processor 1010, the memory 1020, the storage device 1030, and the input/output device 1040 are interconnected using a system bus 1050. The processor 1010 is capable of processing instructions for execution within the computing system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the computing system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the computing system 1000. In some implementations, the storage device 1030 is a computer-readable medium. In various different implementations, the storage device 1030 may be a floppy disk device, a hard disk device, an optical disk device, or a tape device.

The input/output device 1040 provides input/output operations for the computing system 1000. In some implementations, the input/output device 1040 includes a keyboard and/or pointing device. In some implementations, the input/output device 1040 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for providing product suggestions to provide to a customer during a checkout process at a retail store, the system comprising:
    a checkout configuration that includes a point of sale terminal, a scanner to scan products, a scanning preparation area where products to be scanned are positioned, and a customer-facing device that includes a display to present product recommendations to a user;
    one or more cameras oriented toward the scanning preparation area so as to capture and transmit product signals that at least partially identify the products to be scanned that are contained in the scanning preparation area;
    a product identification system that is programmed to identify the products contained in the scanning preparation area from the product signals received from the cameras;
    an inventory fulfillment system that is configured to determine current levels of available in-store stock for products that are candidates for immediate in-store fulfillment in the retail store, wherein the current levels of available in-store stock include current in-store inventories, backroom inventories, and showroom inventories for the products that are candidates for immediate in-store fulfillment; and
    a product recommendation engine that is configured to:
        identify contents of a customer cart from (i) the products contained in the scanning preparation area as identified by the product identification system and (ii) scanned products that have already been identified by the scanner;
        identify a plurality of candidate products to recommend to the user that are different from the products contained in the scanning preparation area and the scanned products;
        obtain the current levels of available in-store stock for the plurality of candidate products;
        select a portion of the plurality of candidate products as product recommendations based, at least in part, on the current levels of available in-store stock for the plurality of candidate products, wherein the product recommendations have current in-store stock levels that are available for immediate in-store fulfillment; and
        transmit the product recommendations to the customer-facing device for display to the user.

2. The system of claim 1, wherein the scanning preparation area includes a conveyor belt that supports and conveys the products to be scanned toward the scanner.

3. The system of claim 1, wherein the scanning preparation area includes an area that is part of or adjacent to the checkout configuration and that is configured for positioning or placing a shopping cart or shopping basket containing the products to be scanned.

4. The system of claim 1, wherein the scanning preparation area includes (i) a conveyor belt that supports and conveys the products to be scanned toward the scanner and (ii) an area that is part of or adjacent to the checkout configuration and that is configured for positioning or placing a shopping cart or shopping basket containing the products to be scanned.

5. The system of claim 1, wherein the cameras are positioned above the scanning preparation area.

6. The system of claim 1, wherein the cameras are positioned laterally adjacent the scanning preparation area.

7. The system of claim 1, wherein the cameras includes a plurality of cameras, at least a first portion of which are positioned above the scanning preparation area and at least a second portion of which are positioned laterally adjacent the scanning preparation area.

8. The system of claim 1, further comprising:
one or more RFID scanners positioned adjacent to the scanning preparation area so as to capture and transmit RFID product signals that identify a portion of the products with RFID tags that are contained in the scanning preparation area and that have yet to be scanned,
wherein the product identification system that is further programmed to identify the products contained in the scanning preparation.

9. The system of claim 1, wherein the product recommendations are determined to be different from the contents of the customer cart.

10. The system of claim 1, wherein the product recommendations are determined additionally based on one or more product purchasing models that are applied to the contents of the customer cart.

11. The system of claim 10, wherein the one or more product purchasing models include a user purchasing model that is specific to the user and that models purchasing behavior of the user based on historical purchases made by the user.

12. The system of claim 10, wherein the one or more product purchasing models include a store purchasing model that is specific to a retail store in which the checkout configuration is located and that models purchasing behavior for customers of the store based on historical purchases made at the store.

13. The system of claim 10, wherein the one or more product purchasing models include a region purchasing model that is specific to a geographic region in which a retail store housing the checkout configuration is located and that models purchasing behavior for customers of the geographic region based on historical purchases made at stores within the geographic region.

14. The system of claim 10, wherein the one or more product purchasing models include a temporal purchasing model that is specific to a current timeframe in which the user is using the checkout configuration and that models purchasing behavior for purchases made within the current timeframe based on historical purchases made within analogous timeframes.

15. The system of claim 14, wherein the current timeframe comprises a time of day.

16. The system of claim 14, wherein the current timeframe comprises a day of the week.

17. The system of claim 14, wherein the current timeframe comprises a week of the year.

18. The system of claim 14, wherein the current timeframe comprises a current season.

19. The system of claim 1, wherein the product recommendation engine is further configured to transmit the current levels of available in-store stock for the product recommendations to the customer-facing device for display to the user.

20. The system of claim 1, wherein the product recommendation engine is further configured to:
receive selection of one or more of the product recommendations from the customer-facing device to be purchased with the content of the customer cart;
transmit the selection of the one or more product recommendations to the point of sale terminal for inclusion in a transaction of the user; and
transmit fulfillment instructions for the one or more of the product recommendations to one or more in-store fulfillment channels.

* * * * *